Patented June 25, 1946

2,402,873

UNITED STATES PATENT OFFICE 2,402,873

REACTION PRODUCTS OF BUTADIENE WITH HYDROGEN CYANIDE

Donald Drake Coffman and Leroy Frank Salisbury, Wilmington, Del., assignors to E. I. du Pont de Nemours & Company, Wilmington, Del., a corporation of Delaware No Drawing. Application February 23, 1943, Serial No. 476,850

12 Claims. (Cl. 260—93)

This invention relates to the reaction of butadiene and hydrogen cyanide and to new compositions of matter particularly organic nitriles.

This invention has as an object the provision of a process for the preparation of nitriles. A further object is the preparation of polymeric nitriles. Other objects will appear hereinafter.

These objects are accomplished by the following invention wherein butadiene is reacted in the presence of a catalyst which is preferably a Friedel-Crafts catalyst with hydrogen cyanide.

The reaction of butadiene and hydrogen cyanide is conveniently carried out by placing butadiene, catalyst, and excess hydrogen cyanide in a pressure vessel. The vessel is then agitated at 20–50° C. for approximately 12 hours. Upon opening, the nitrile is removed by extraction with acetone, chloroform or ether. The solvent is evaporated to obtain the crude organic nitrile. Chloroform or ether solutions of these nitriles are washed with water to remove the catalyst and dried over anhydrous magnesium sulfate. The nitrile is obtained by evaporation of the solvent. In case the nitrile is an easily distillable liquid, it is purified further by distillation. However, if the nitrile is non-volatile, it is dissolved in chloroform and the chloroform solution is thoroughly washed with water and dried with anhydrous magnesium sulfate. The purified nitrile is obtained by evaporation of the chloroform. In certain cases non-volatile nitriles are formed that are insoluble in chloroform. These are worked up by triturating with cold, dilute alkali, and then with water followed by drying over phosphoric anhydride preferably in an inert atmosphere.

The more detailed practice of the invention is illustrated by the following examples, wherein parts given are by weight. There are of course many forms of the invention other than these specified embodiments.

Example I

This example illustrates the formation of a polynitrile by the reaction of butadiene and hydrogen cyanide in the presence of boron trifluoride.

Into 20 parts of liquid hydrogen cyanide (0.74 mole) was bubbled 15 parts of boron trifluoride (0.22 mole). This mixture was then distilled and 18 parts of a boron trifluoride-hydrogen cyanide complex was caught in a receiver cooled with a "Dry-Ice"-acetone mixture. This catalyst, which contained 7.8 parts (0.0115 mole) of boron trifluoride and 8.2 parts (0.3 mole) of hydrogen cyanide, was sealed with 20 parts of butadiene and 80 parts of hydrogen cyanide in a pressure vessel and heated at 50° C. for 12 hours with constant agitation. At the end of this time the pressure vessel was vented to traps which removed unreacted hydrogen cyanide and condensed unreacted butadiene. A total of 8.5 parts of unreacted butadiene was recovered. The bomb was opened and found to contain 27 parts of a mixture of 8 parts of liquid hydrogen cyanide which was removed by distillation and 18 parts of a brown, viscous polynitrile soluble in acetone and chloroform but insoluble in water, ether, saturated hydrocarbons, and benzene.

Example II

This example illustrates the preparation of a polynitrile by the reaction of butadiene and hydrogen cyanide in the presence of boron trifluoride and the hydrolysis of this nitrile to a polycarboxylic acid.

The complex of boron trifluoride and hydrogen cyanide was prepared, as in Example I, by bubbling gaseous boron trifluoride into liquid hydrogen cyanide. The complex was distilled by warming with hot water and was caught in a trap cooled with a mixture of "Dry Ice" and acetone. To a pressure vessel cooled by means of a cold bath consisting of a mixture of "Dry Ice" and acetone and protected from moisture of the atmosphere were added 50 parts (0.925 mole) of butadiene, 100 parts (3.7 moles) of hydrogen cyanide, and an amount of boron trifluoride-hydrogen cyanide complex corresponding to 12.8 parts (0.19 mole) of boron trifluoride and 12 parts (0.44 mole) of hydrogen cyanide. The vessel was sealed and heated to 50° C. with agitation for 12 hours. After the vessel had cooled to room temperature the unreacted gases were bled off through traps which condensed hydrogen cyanide and butadiene. Butadiene (32 parts or 0.6 mole) and hydrogen cyanide (85 parts or 3.1 moles) were recovered unchanged. The pressure vessel contained 21 parts of a brown, unsaturated, nitrogen-containing viscous oil soluble in acetone and chloroform but insoluble in ether, paraffin hydrocarbons, benzene and water which was purified in the following way: the oil was dissolved in chloroform, the resultant solution then washed thoroughly with water and dried with anhydrous magnesium sulfate and finally the chloroform was removed by evaporation. The amount of product obtained in this way corresponded to a 36% conversion of butadiene and a 93% yield of the theoretical amount (based on the weight of reactants consumed) of a polynitrile having a molecular weight of 333. Hydrolysis of this polynitrile by heating with excess concentrated hydrochloric acid at the reflux temperature gave an unsaturated polycarboxylic acid whose neutral equivalent was 216. This value corresponds to one carboxyl group per twelve carbon atoms. The polycarboxylic acid was soluble in water but insoluble in most common organic solvents. Both the nitrile and the acid were unsaturated and were cast into tacky films that hardened upon exposure to the atmosphere.

*Example III*

This example illustrates the synthesis of a polynitrile in improved conversions by the use of one mol of boron trifluoride as catalyst for each mol of butadiene present.

The catalyst was prepared by bubbling 35 parts of boron trifluoride into 50 parts of hydrogen cyanide and distilling the complex formed as described in Example I. The entire amount of this catalyst, together with 25 parts of butadiene and 50 parts of liquid hydrogen cyanide was introduced into a cold pressure vessel which was then sealed. In these proportions the amount of boren trifluoride present was equivalent to a 1/1 molar ratio of butadiene/boron trifluoride. The pressure vessel was agitated for 12 hours at room temperature. At the end of the reaction period the pressure vessel was vented to cold traps, which trapped, from the off gases, 15 parts of hydrogen cyanide and 9 parts of butadiene. The pressure vessel contained 34 parts of a brown, viscous polynitrile containing 8.94% N and having a molecular weight of 356. This amount corresponded to a 64% conversion of butadiene and a 100% yield of polynitrile. This nitrile was soluble in acetone but not in chloroform or other common organic solvents. It was unsaturated and reacted with bromine and with the oxygen of the atmosphere.

In the process of this invention polynitriles can be prepared. Thus, the reaction of butadiene with hydrogen cyanide in the presence of Friedel-Crafts catalysts (Chem. Reviews 17, 327 (1935) Table II) e. g., boron trifluoride, aluminum chloride, zinc chloride, aluminum bromide, stannic chloride, titanium tetrachloride, zirconium tetrachloride, antimonic chloride leads to unsaturated organic polynitriles. This is illustrated by the reaction of butadiene and excess hydrogen cyanide in the presence of boron trifluoride, in which case unsaturated polynitriles are formed in high conversions of butadiene and good yields of polynitriles. In fact, nearly 70% conversions of butadiene and quantitative yields of polynitriles are obtained when as much as one mol of boron trifluoride is used as a catalyst for each mol of butadiene present. Although it is preferred to use one mol of catalyst for each mol of butadiene, smaller amounts may be employed, in which case reduced conversions of butadiene are obtained. These polynitriles are unsaturated and can be hydrolyzed to unsaturated polycarboxylic acids. Both the nitriles and the polycarboxylic acids formed by hydrolysis of the nitriles absorb oxygen from the atmosphere to become insoluble and of increased hardness.

The polymeric products of this invention are of relatively low molecular weight, i. e., in the neighborhood of 350 and are soluble in acetone.

The proportions of butadiene and hydrogen cyanide which can be used in this reaction vary widely and an excess of butadiene or hydrogen cyanide may be used. In those cases where an excess of butadiene is employed it is desirable not to use an amount greater than a two to one mol ratio of butadiene to hydrogen cyanide. However, it is preferred to carry out the reaction in the presence of an excess of hydrogen cyanide, e. g., where the mol ratio of butadiene to hydrogen cyanide varies from 1/1 to 1/4.

Butadiene may be reacted with hydrogen cyanide over a wide range of temperatures but, for ease of operation, it is preferred to carry out the reaction at temperatures between $-14°$ C. and $184°$ C. The time required for the reaction is not critical, twelve hours being sufficient in most cases. It is preferred to prevent ingress of moisture, since water tends to hydrolyze hydrogen cyanide to formic acid and ammonia, and since certain of the catalysts employed, e. g., boron trifluoride, aluminum chloride, etc., are susceptible to hydrolysis.

The types of apparatus that may be used in the practice of this invention are numerous and varied but do not constitute a part of the invention. Butadiene and hydrogen cyanide are low boiling liquids and it is advantageous to carry out the reaction under superatmospheric pressures. These pressures may vary from 1 to 50 atmospheres (i. e., atmospheric pressure to the critical pressure of hydrogen cyanide). The preferred pressure range is 1 to 25 atmospheres. The pressure of the reaction mixture is in the latter range when temperatures of up to $100°$ C. are employed. The apparatus used should be capable of withstanding superatmospheric pressures and should be so designed to allow accurate temperature control. Further it should be so designed to prevent ingress of moisture and should have facilities for charging and venting without danger of hydrogen cyanide vapors being discharged to the peril of the operator.

The unsaturated organic polynitriles obtained from the reaction of butadiene and hydrogen cyanide in the presence of Friedel-Crafts catalysts can be cast into tacky films that harden upon exposure to the atmosphere. These nitriles can be hydrolyzed to water-soluble, unsaturated polycarboxylic acids which air dry and become insoluble.

The above description and examples are intended to be illustrative only. Any modification of or variation therefrom which conforms to the spirit of the invention is intended to be included within the scope of the claims.

What is claimed is:

1. Process which comprises reacting butadiene with hydrogen cyanide by bringing the same in contact in the presence of a Friedel-Crafts type catalyst.

2. Process which comprises reacting butadiene with hydrogen cyanide by bringing the same in contact in the presence of at least one mol, per mol of butadiene, of a Friedel-Crafts type catalyst.

3. Process which comprises reacting butadiene with hydrogen cyanide by bringing the same in contact in the presence of a boron trifluoride catalyst.

4. Process which comprises reacting butadiene with hydrogen cyanide by bringing the same in contact in the presence of at least one mol, per mol of butadiene, of a boron trifluoride catalyst.

5. An addition product of butadiene and hydrogen cyanide, said product being obtained by the reaction of said materials, in the presence of a Friedel-Crafts type catalyst.

6. A polymeric product of the addition of hydrogen cyanide to butadiene, said product being obtained by the reaction of said materials, in the presence of a Friedel-Crafts type catalyst and being soluble in acetone and having a molecular weight of about 350.

7. Process which comprises reacting butadiene with hydrogen cyanide by bringing the same in contact, in the ratio of from one-half to four mols of hydrogen cyanide per mol of butadiene, under anhydrous conditions, at a temperature within the range, −14 to 184° C., at a pressure within the range, 1–50 atmospheres, and in the presence of a Friedel-Crafts type halide catalyst.

8. Process which comprises reacting butadiene with hydrogen cyanide by bringing the same in contact, in the ratio of from one-half to four mols of hydrogen cyanide per mol of butadiene, under anhydrous conditions, at a temperature within the range, −14 to 184° C., at a pressure within the range, 1–50 atmospheres, and in the presence of about one mol, per mol of butadiene, of a Friedel-Crafts type halide catalyst.

9. Process which comprises reacting butadiene with hydrogen cyanide by bringing the same in contact, in the ratio of from one-half to four mols of hydrogen cyanide per mol of butadiene, under anhydrous conditions, at a temperature within the range, −14 to 184° C., at a pressure within the range, 1–50 atmospheres, and in the presence of a boron trifluoride catalyst.

10. Process which comprises reacting butadiene with hydrogen cyanide by bringing the same in contact, in the ratio of from one-half to four mols of hydrogen cyanide per mol of butadiene, under anhydrous conditions, at a temperature within the range, −14 to 184° C., at a pressure within the range, 1–50 atmospheres, and in the presence of about one mol, per mol of butadiene, of a boron trifluoride catalyst.

11. A polymeric material soluble in acetone, insoluble in ether, paraffin hydrocarbons and benzene, containing a plurality of nitrile groups, having a molecular weight of about 350 said material being obtained by bringing butadiene in contact with from one-half to four mols, per mol of butadiene, of hydrogen cyanide under anhydrous conditions, at a temperature within the range, −14° C. to 184° C., at a pressure within the range, 1 to 50 atmospheres, in the presence of a Friedel-Crafts halide catalyst.

12. A polymeric material soluble in acetone, insoluble in ether, paraffin hydrocarbons and benzene, containing a plurality of nitrile groups, having a molecular weight of about 350 said material being obtained by bringing butadiene in contact with from one-half to four mols, per mol of butadiene, of hydrogen cyanide under anhydrous conditions, at a temperature within the range, −14° C. to 184° C., at a pressure within the range, 1 to 50 atmospheres, in the presence of a boron trifluoride catalyst.

DONALD DRAKE COFFMAN.
LEROY FRANK SALISBURY.